(12) United States Patent
Pantalone

(10) Patent No.: US 7,836,134 B2
(45) Date of Patent: Nov. 16, 2010

(54) E-MAIL ADDRESS INSPECTION

(75) Inventor: Brett Anthony Pantalone, Pittsboro, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 669 days.

(21) Appl. No.: 11/426,774

(22) Filed: Jun. 27, 2006

(65) Prior Publication Data

US 2007/0288578 A1 Dec. 13, 2007

Related U.S. Application Data

(60) Provisional application No. 60/804,317, filed on Jun. 9, 2006.

(51) Int. Cl.
*G06F 15/16* (2006.01)
(52) U.S. Cl. .................................... 709/206
(58) Field of Classification Search ................. 709/206
See application file for complete search history.

(56) References Cited

U.S. PATENT DOCUMENTS

| 6,185,599 | B1* | 2/2001 | Salimando et al. ........... 709/202 |
| 6,539,421 | B1* | 3/2003 | Appelman et al. ........... 709/206 |
| 6,564,213 | B1* | 5/2003 | Ortega et al. .................... 707/5 |
| 2001/0002469 | A1* | 5/2001 | Bates et al. ..................... 707/1 |
| 2001/0028469 | A1* | 10/2001 | Ooi et al. ...................... 358/1.9 |
| 2002/0087647 | A1 | 7/2002 | Quine et al. |
| 2003/0131030 | A1 | 7/2003 | Sebot et al. |
| 2004/0153519 | A1 | 8/2004 | Stolze |
| 2004/0203949 | A1 | 10/2004 | Nielsen et al. |
| 2004/0215726 | A1 | 10/2004 | Arning et al. |
| 2005/0131888 | A1* | 6/2005 | Tafoya et al. ................... 707/3 |
| 2006/0035632 | A1* | 2/2006 | Sorvari et al. ............... 455/418 |
| 2006/0048074 | A1* | 3/2006 | Klein ......................... 715/811 |
| 2006/0242109 | A1* | 10/2006 | Pereira et al. ................... 707/1 |
| 2007/0067394 | A1* | 3/2007 | Adams et al. ............... 709/206 |
| 2007/0283044 | A1* | 12/2007 | Van Belle et al. ........... 709/245 |

OTHER PUBLICATIONS

International Preliminary Report on Patentability, corresponding to International Patent Application No. PCT/US2007/060449, dated Aug. 20, 2008.
Sony Ericsson Mobile Communications AB, International Search Report, issued in corresponding International Patent Application No. PCT/US2007/060449, Sep. 20, 2007.
Sony Ericsson Mobile Communications AB, Written Opinion, issued in corresponding International Patent Application No. PCT/US2007/060449, Sep. 20, 2007.
State Intellectual Property Office, P.R. China. First Office Action. Apr. 23, 2010.

* cited by examiner

*Primary Examiner*—John Follansbee
*Assistant Examiner*—Imad Hussain
(74) *Attorney, Agent, or Firm*—R. Brian Drozd; Moore & Van Allen PLLC

(57) ABSTRACT

A method for e-mail address inspection may include providing a list of suggested or predicted addresses in response to a partial e-mail address being received. The method may also include checking the partial e-mail address for other possible matches in an electronic address book in response to an address being selected by a user from the list of suggested or predicted addresses. The method may further include presenting a warning in response to other possible matches and the selected address not being in a predetermined domain.

20 Claims, 5 Drawing Sheets

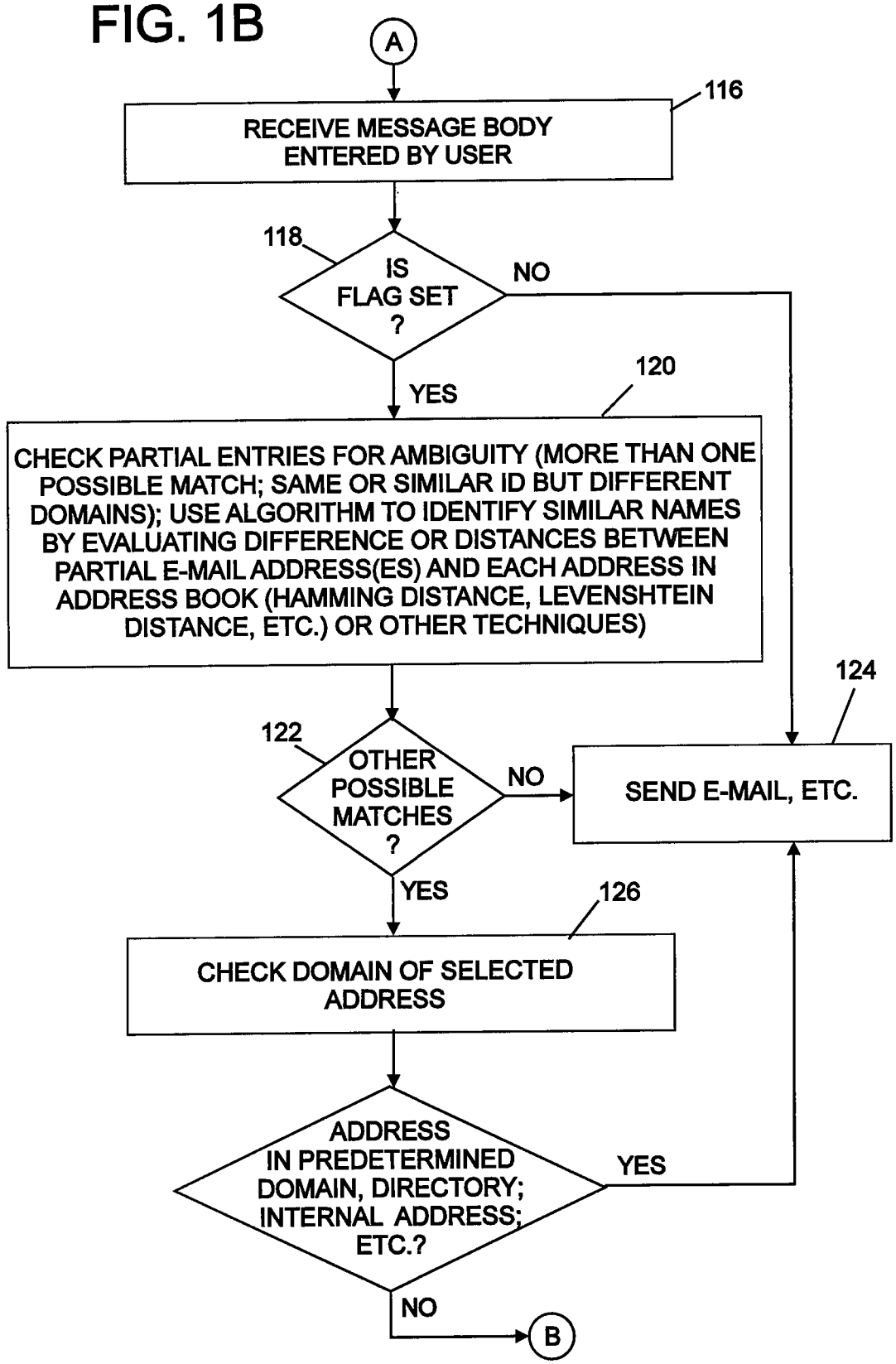

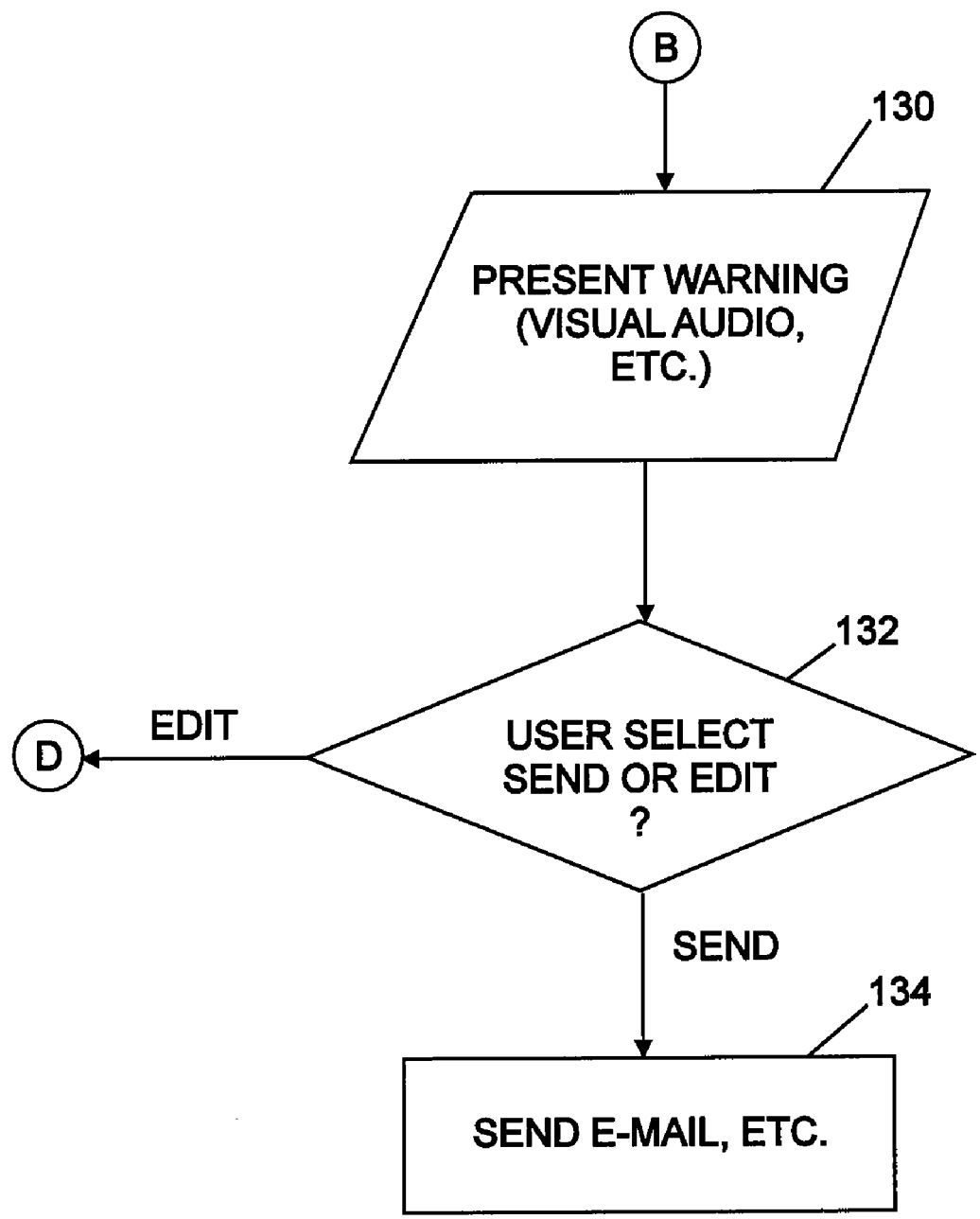

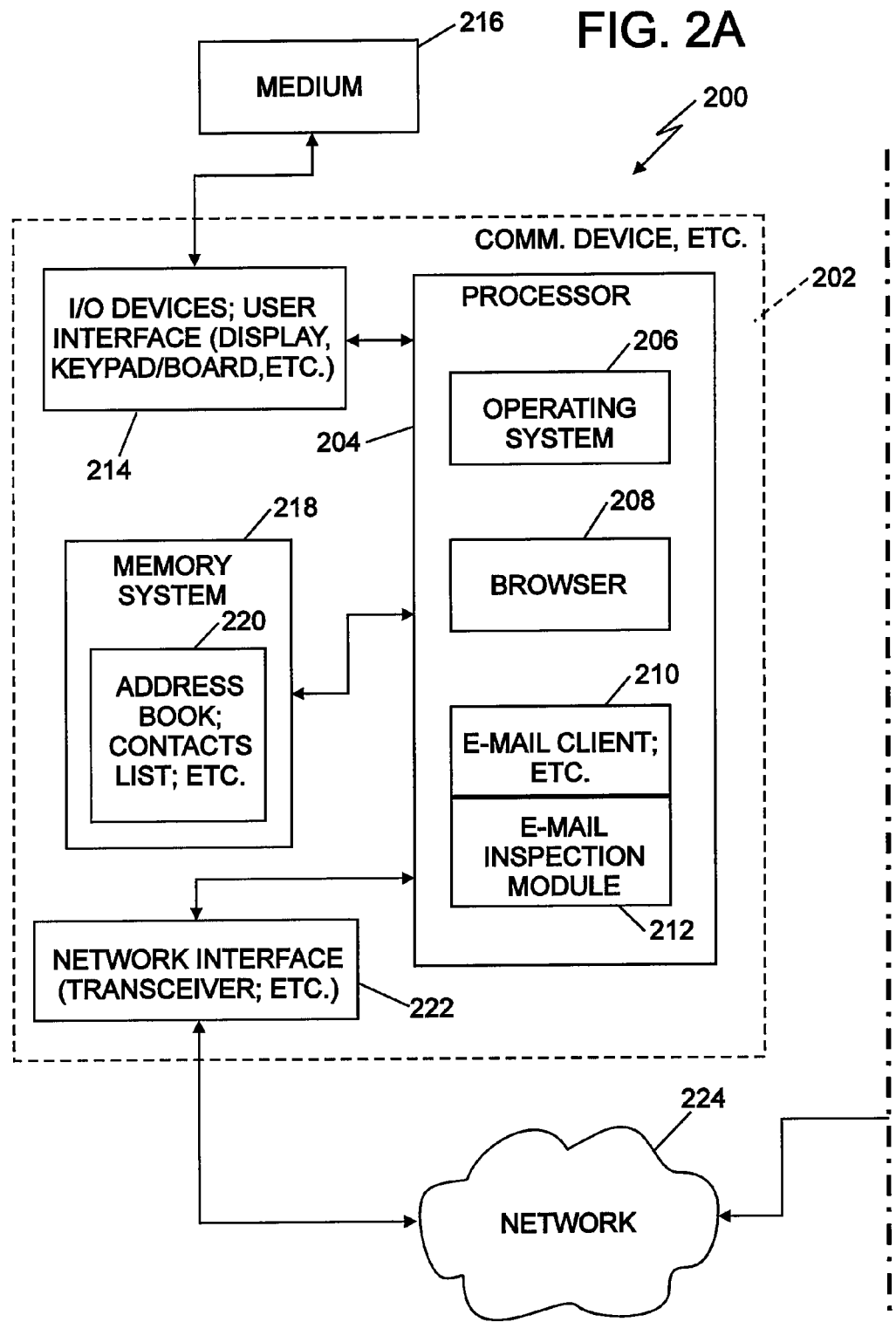

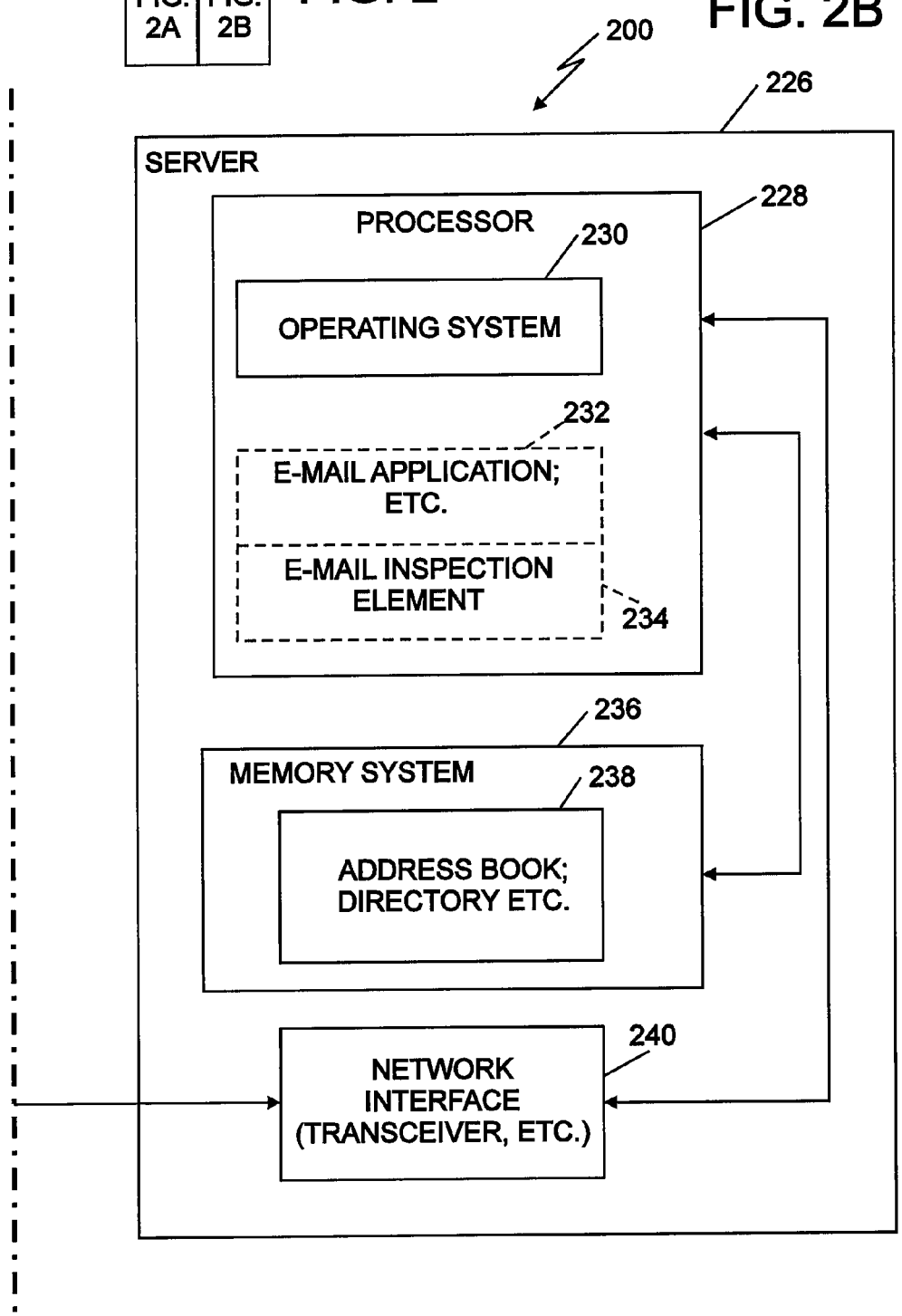

E-MAIL ADDRESS INSPECTION

CROSS REFERENCE TO RELATED APPLICATIONS

This application is a Continuation of U.S. Provisional Application No. 60/804,317, filed Jun. 9, 2006 naming Brett Anthony Pantalone, as the inventor. The benefit of the filing date of this application is hereby claimed for all purposes that are legally served by such claim for the benefit of the filing date.

BACKGROUND OF THE INVENTION

The present invention relates to electronic mail and similar forms of communication, and more particularly to a communications device and method for electronic mail or e-mail address inspection to detect ambiguities or similar improper addresses.

Many e-mail composing programs or the like have a predictive input text feature, whereby the user enters only the first several characters of a destination address and the software completes the address by matching against recently used addresses or addresses in an electronic address book, list of contacts or the like. While this feature can be a great time saver in some cases, it can also present a risk of sending an e-mail to the wrong person, possibly with undesirable consequences. When the user input is ambiguous or there may be multiple possible addresses corresponding to the partial input, the software may present a list of potential matches from which the user may select. A wrong address or an address that the user does not want the e-mail going to may inadvertently be selected from the list. In such situations, sensitive information may be accidentally sent to the wrong recipient, such as a recipient outside the user's domain, organizational network or the like.

BRIEF SUMMARY OF THE INVENTION

In accordance with an embodiment of the present invention, a method for e-mail address inspection may include providing a list of suggested or predicted addresses in response to a partial e-mail address being received. The method may also include checking the partial e-mail address for other possible matches in an electronic address book in response to an address being selected by a user from the list of suggested or predicted addresses. The method may further include presenting a warning in response to other possible matches and the selected address not being in a predetermined domain.

In accordance with another embodiment of the present invention, a communications device may include an e-mail module to provide a list of suggested or predicted addresses in response to a partial e-mail address being received and to check the partial e-mail address for other possible matches in an electronic address book in response to an address being selected by a user from the list of suggested or predicted addresses. The communications device may also include a user interface to present a warning in response to other possible matches and the selected address not being in a predetermined domain.

In accordance with another embodiment of the present invention, a system may include a network for sending and receiving e-mails. The system may also include an e-mail module to provide a list of suggested or predicted addresses in response to a partial e-mail address being received and to check the partial e-mail address for other possible matches in an electronic address book in response to an address being selected by a user from the list of suggested or predicted addresses.

In accordance with another embodiment of the present invention, a computer program product for e-mail address inspection may include a computer useable medium having computer useable program code embodied therein. The computer useable medium may include computer useable program code configured to provide a list of suggested or predicted addresses in response to a partial e-mail address being received and to check the partial e-mail address for other possible matches in an electronic address book in response to an address being selected by a user from the list of suggested or predicted addresses. The computer useable medium may also include computer useable program code configured to present a warning in response to other possible matches and the selected address not being in a predetermined domain.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIGS. 1A, 1B and 1C (collectively FIG. 1) are a flow chart of an example of a method for e-mail inspection in accordance with an embodiment of the present invention.

FIG. 2 is a block schematic diagram of an exemplary communication device and system for e-mail inspection in accordance with an embodiment of the present invention.

DETAILED DESCRIPTION OF THE INVENTION

Figure 1A:
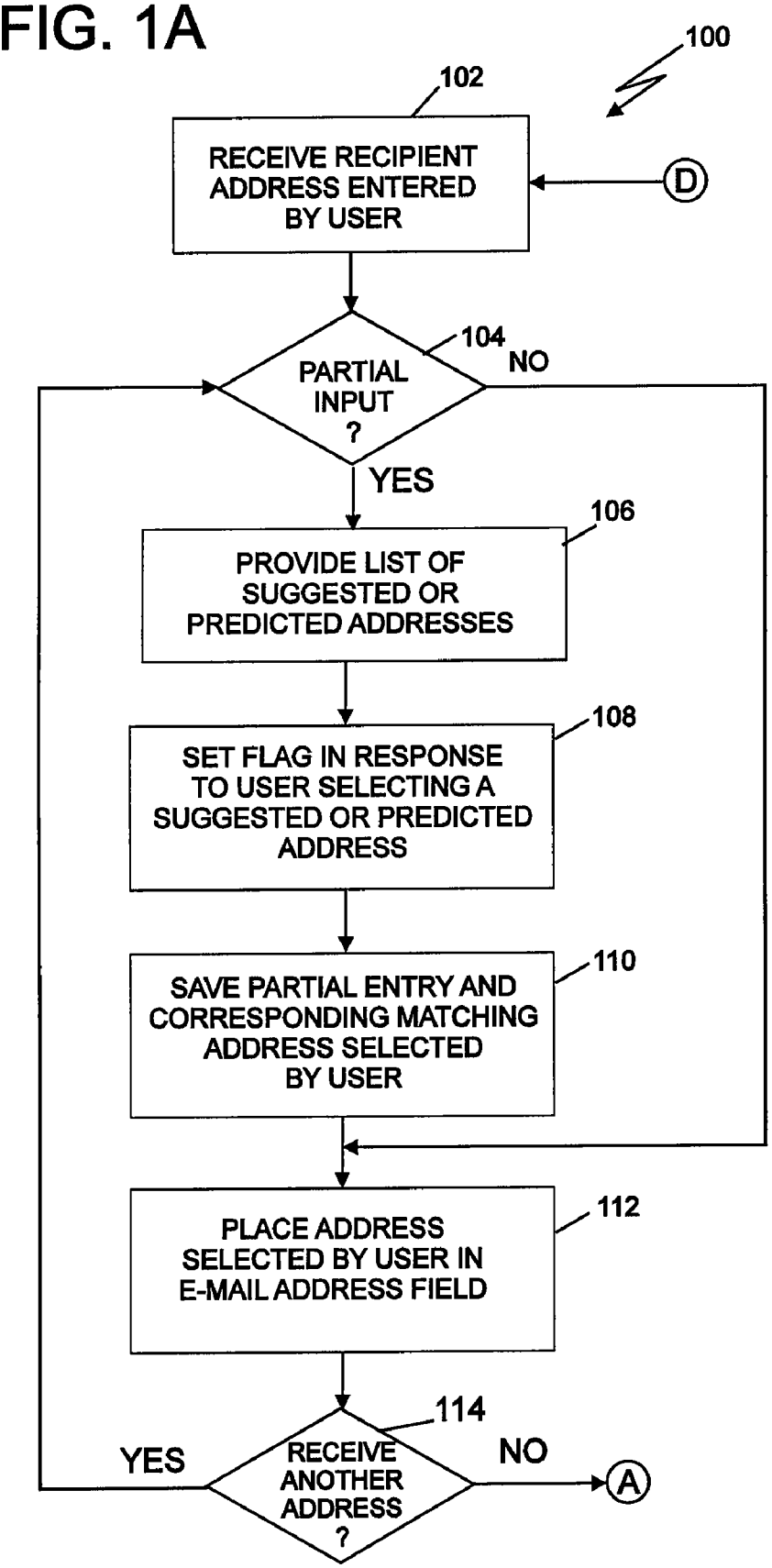

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer useable medium may be utilized. The computer-usable or computer-readable medium may be, for example but not limited to, an electronic, magnetic, optical, electromagnetic, or semiconductor system, apparatus, device, or medium. More specific examples (a non-exhaustive list) of the computer-readable medium would include some or all of the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain or store the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIGS. 1A, 1B and 1C (collectively FIG. 1) are a flow chart of an example of a method 100 for e-mail address inspection in accordance with an embodiment of the present invention. As used herein e-mail may include any type of electronic communication or electronic message service where an electronic address for a recipient of a message may be specified, entered or selected, including but not necessarily limited to e-mail, instant messaging, short message service or similar services. In block 102, a recipient or destination address entered by a user may be received. In block 104, a determination may be made if the entry by the user is a partial input or partial e-mail address. If a determination is made in block 104 that a partial e-mail address has not been entered, that is, a complete e-mail address has been entered by the user, the method 100 may advance to block 112 and the complete e-mail address may be placed in an address field of the e-mail being composed. If a determination is made in block 104 that a partial e-mail address has been entered in block 102, a list of suggested or predicted addresses may be provided or presented to the user in block 106. The list of suggested or predicted addresses may be recently used addresses or addresses from an address book, contacts list or the like stored on a communications device or elsewhere. In another embodiment of the present invention, the suggested or predicted addresses may be presented after the user has entered only a portion of a complete e-mail address.

In block 108, a flag or other indication may be set in response to the user selecting an address from the list of suggested or predicted addresses. In block 110, the partial e-mail address entry and the corresponding matching address selected by the user from the list may be saved in a memory of the communications device or elsewhere in a system. In block 112, the complete address selected by the user may be placed in the address field of the e-mail being composed.

In block 114, a determination may be made if another address has been received. If a determination is made in block 114 that another address or partial address has been received or entered, the method 100 may return to block 104 and the method 100 may proceed as previously described. If a determination is made in block 114 that another address has not been received, the method 100 may advance to block 116. In block 116, a message body entered into the communications device by the user may be received.

In block 118, a determination may be made if the flag has been set in response to the user selecting a suggested or predicted address in block 108. If a determination is made in block 118 that the flag is not set, the method 100 may advance to block 124 and the e-mail or other type communication may be sent. If a determination is made in block 118 that the flag has been set, the method 100 may advance to block 120.

In block 120, the partial entry or partial entries of an e-mail address or addresses saved in block 110 may be checked for any ambiguity or if there is more than one match in an electronic address book. As used herein, an electronic address book may be a contacts list, organization directory, domain or the like. The electronic address book may be stored on the communications device or elsewhere on a system or network, such as on a server or other data source.

In block 120, the partial entries may be checked against the electronic address book for the same or similar identification (ID), user name or the like, but different domains. An algorithm may be used to identify similar addresses, such as an algorithm to identify similar names by evaluating differences or distances between the partial e-mail address and each address in the address book. For example, the partial e-mail address may be checked for possible matches by determining either a Hamming distance or a Levenshtein distance between the partial address and each address in the electronic address book. Determining Hamming distance or Levenshtein distance is used by spell checking algorithms to suggest replacements for mistyped words.

In block 122, a determination may be made if any ambiguities or other possible matches for the partial e-mail address were detected in block 120. If no ambiguities or other possible matches were detected, the e-mail or other communication may be sent in block 124. If other possible matches were detected in block 126, the method 100 may advance to block 128.

In block 128, a determination may be made if the address selected by the user from the list of suggested or predicted addresses is in a predetermined domain. The predetermined domain may be a directory for an organization, such as a corporation, a list of internal addresses, authorized addresses or the like. If a determination is made in block 128 that the address selected from the list of suggested or predicted addresses is in the predetermined domain, the method 100 may return to block 124 and the e-mail or other communication may be sent.

If a determination is made in block 128 that the selected address is not in the predetermined domain, the method 100 may advance to block 130. In block 130, a warning may be presented to the user. The warning may be a visual, audio or combination audio and visual warning that the e-mail may be addressed to a recipient that is not desired or that is not part of the predetermined domain.

In block 132, a user may select to go ahead and send the e-mail or to edit the e-mail address. If the user selects to send the e-mail, the e-mail or other communications is sent in block 134. If the user selects the option to edit the e-mail address, the method 100 may return to block 102 and the method 100 may proceed as previously described.

FIG. 2 is a block schematic diagram of an exemplary system 200 and communications device 202 for e-mail inspection in accordance with an embodiment of the present invention. The communications device 202 may be a computer system, mobile computing system, personal digital assistant, cellular telephone or the like capable of sending e-mails or other electronic communications via a wireless or wire line connection. The method 100 of FIG. 1 may be embodied in the system 200 or communications device 202.

The communications device 202 may include a processor 204. An operating system 206 may run on the processor to control overall operation of the communications device 202. The communications device 202 may also include a browser 208 for accessing web sites or the like on a network, such as the Internet, a private network or other type of network. The communications device 202 may also include an e-mail client 210, application or the like that may be operable on the processor 204. The communications device 202 may also include an e-mail inspection module 212. The e-mail inspection module 212 may be part of the e-mail client 210 or may be features within the e-mail client 210, or may be a separate module that operates in association with the e-mail client 210. The method 100 may be embodied in the e-mail inspection module 212 or e-mail client 210 if combined. Accordingly, the blocks 102-134 or features described with respect to method 100 may correspond to components or elements of the e-mail inspection module 212 or e-mail client 210.

The communications device 202 may also include an input/output (I/O) device or devices and a user interface 214. The user interface 214 may include a display or monitor, keypad, keyboard or the like for a user to enter data and perform the functions described with respect to method 100. The I/O device or devices may include disk drives or the like to download data from a computer useable or readable medium 216 as defined herein.

The communications device 202 may also include a memory system 218. Among other data useable by the communications device 202, the memory system 218 may include an address book 220, contacts list or the like that may be used in conjunction with the e-mail client 210 and e-mail inspection module 212 similar to that described with respect to method 100 of FIG. 1.

The communications device 202 may also include a network interface 222 for accessing a network 224. The network interface 222 may be or may include a wireless transceiver for communicating with the network 224 via radio signals. The network 224 may be a wireless communications network, wire line communications network or a combination wire line and wireless communications network. The network 224 may also be or include the Internet or other network.

The communications device 202 may access a server 226 or other elements or components that may be part of the system 200 via the network 224. The server 226 may include a processor 228. An operating system 230 may be operable on the processor 228 to control operation of the server 226 and to perform various other functions, such as e-mail services and the like.

In some embodiments of the present invention, an e-mail application 232 or similar application may be operable on the processor 230. An e-mail inspection component or element 234 may also be operable on the server processor 228. The e-mail inspection component or element 234 may be part of the e-mail application 232 or may be a separate component operable in conjunction with the e-mail application 232. The e-mail application 232 and e-mail inspection component 234 may function in coordination with the e-mail client 210 and e-mail module 212 in the communications device 202. The e-mail application 232 and e-mail inspection component 234 may perform some or most of the operations associated with a method of e-mail address inspection similar to that described with respect to FIG. 1, particularly in communications devices that may have limited capacity to completely perform such functions.

The server 226 may also include a memory system 236. The memory system 236 may include an address book 238, directory or the like that may define the domain for an organization that can be checked to detect ambiguities in e-mail addresses as previously described. Alternately, the address book 238, directory or the like may be stored in a separate database that is accessible by the server 226.

The server 226 may also include a network interface 240 for accessing the network 224. The network interface 240 may be similar to network interface 222 in the communications device 202. The network interface 240 may also be or may include a transceiver for accessing the network 224 via a wireless, wire line or combination wireless and wire line connection.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for e-mail address inspection, comprising:
providing a list of suggested or predicted addresses on a communications device in response to a partial e-mail address being entered into the communications device by a user, the communications device comprising a processor;
receiving a selection of one of the suggested or predicted addresses from the list of suggested or predicted addresses in response to the user entering a partial email address, wherein the selected one of the suggested or predicted addresses is placed in an address field of a message;
setting a flag in the communications device to indicate that the user has selected one of the suggested or predicted addresses from the list of suggested or predicted addresses, wherein the flag is not set when the complete email address has been typed in by the user so that the user has not selected a suggested or predicted address;
saving the partial e-mail address and the address selected by the user from the list of suggested or predicted addresses by the communications device;
using the saved partial e-mail address to check for other possible matches to the saved partial e-mail address in an electronic address book in response to the flag being set;
presenting a warning to the user by the communications device in response to other possible matches being found in the electronic address book and the selected address not being in a predetermined domain;
and not presenting said warning to the user by the communications device in response to other possible matches not being found in the electronic address book or the selected address being in a predetermined domain.

2. The method of claim 1, further comprising sending the e-mail in response to the flag not being set.

3. The method of claim 1, wherein using the partial e-mail address to check for other possible matches comprises using an algorithm to identify similar addresses.

4. The method of claim 1, wherein using the partial e-mail address to check for other possible matches comprises evaluating a difference or distance between the partial e-mail address and each address in the electronic address book.

5. The method of claim 1, wherein using the partial e-mail address to check for other possible matches comprises determining one of a Hamming distance and a Levenshtein distance between the partial e-mail address and each address in the electronic address book.

6. The method of claim 1, further comprising checking a domain of the address selected by the user from the list of suggested or predicted addresses in response to at least one other match being detected.

7. The method of claim 6, further comprising determining whether the selected address is an address in a predetermined domain in response to at least one other match being detected.

8. The method of claim 7, further comprising sending the e-mail in response to one of no other matches being detected or the selected address being an address in the predetermined domain.

9. The method of claim 1, further comprising:
sending the e-mail in response to the user selecting to send the e-mail; and
permitting the address to be edited in response to the user selecting to edit the address.

10. A communications device, comprising:
a processor and a memory;
an e-mail module, when executed on the processor, configured to:
provide a list of suggested or predicted addresses in response to a partial e-mail address being received; and
receive a selection of one of the suggested or predicted addresses from the list of suggested or predicted addresses in response to the user entering a partial email address, wherein the selected one of the suggested or predicted addresses is placed in an address field of a message
set a flag in the communications device in to indicate that in response to the user has selected selecting one of the addresses from the list of suggested or predicted addresses, wherein the flag is not set when the complete email address has been typed in by the user so that the user has not selected a suggested or predicted address,
wherein the selected one of the suggested or predicted addresses is placed in an address field of a message and the partial email address is saved by the communications device, the saved partial email address being used to check for other possible matches in an electronic address book in the communication device in response to the user selecting one of the suggested or predicted addresses from the list; and
a user interface configured to present a warning in response to other possible matches to the partial email address being found in the electronic address book and the selected address not being in a predetermined domain and to not present said warning in response to other possible matches to the partial email address not being found in the electronic address book or the selected address being in a predetermined domain.

11. The communications device of claim 10, further comprising a memory to save the partial e-mail address and the address selected by the user from the list of suggested or predicted addresses.

12. The communications device of claim 10, further comprising an algorithm stored on the communications device to identify addresses similar to the partial e-mail address.

13. The communications device of claim 10, wherein the e-mail module further comprises a component to evaluate a difference or distance between the partial e-mail address and each address in the electronic address book.

14. The communications device of claim 10, wherein the e-mail module further comprises a component to determine one of a Hamming distance and a Levenshtein distance between the partial e-mail address and each address in the electronic address book.

15. The communications device of claim 10, wherein the e-mail module further comprises a component to check a domain of the address selected by the user from the list of suggested or predicted addresses in response to at least one other match being detected.

16. The communications device of claim 10, further comprising a network interface to send the e-mail to a network in response to one of no other matches being detected or the selected address being an address in the predetermined domain.

17. A non-transitory computer readable medium having computer useable program code embodied therein, the computer useable program code, when executed on at least one computer, allows the at least one computer to:
provide a list of suggested or predicted addresses in response to a partial e-mail address being received;
receive a selection of one of the suggested or predicted addresses from the list of suggested or predicted addresses in response to the user entering a partial email address, wherein the selected one of the suggested or predicted addresses is placed in an address field of a message;
set a flag in the communications device to indicate that the user has selected one of the suggested or predicted addresses from the list of suggested or predicted addresses, wherein the flag is not set when the complete email address has been typed in by the user so that the user has not selected a suggested or predicted address;
save the partial e-mail address and the address selected by the user from the list of suggested or predicted addresses by the communications device;
use the saved partial e-mail address to check for other possible matches to the saved partial e-mail address in an electronic address book in response to the flag being set; and
present a warning in response to other possible matches and the selected address not being in a predetermined domain and not present a warning in response to no other possible matches or the selected address being in a predetermined domain.

18. The computer readable medium of claim 17, further comprising computer useable program code configured to identify similarities between the partial e-mail address and addresses in the electronic address book.

19. The computer readable medium of claim 17, further comprising computer useable program code configured to evaluate a difference or distance between the partial e-mail address and each address in the electronic address book.

20. The computer readable medium of claim 17, further comprising computer useable program code configured to send the e-mail in response to one of no other matches being detected or the selected address being an address in the predetermined domain.

\* \* \* \* \*